(12) United States Patent
Donlon et al.

(10) Patent No.: US 7,488,383 B2
(45) Date of Patent: *Feb. 10, 2009

(54) GYPSUM PRODUCTS AND METHOD FOR THEIR MANUFACTURE

(75) Inventors: Thomas Michael Donlon, Louisville, KY (US); Steven Joseph Wantling, Brandon, MS (US); Bonnie Sherrard Zepka, Louisville, KY (US)

(73) Assignee: Hexion Specialty Chemicals, Inc., Columbus, OH (US)

( * ) Notice: Subject to any disclaimer, the term of this patent is extended or adjusted under 35 U.S.C. 154(b) by 611 days.

This patent is subject to a terminal disclaimer.

(21) Appl. No.: 10/537,691

(22) PCT Filed: Jun. 3, 2004

(86) PCT No.: PCT/US2004/017627

§ 371 (c)(1),
(2), (4) Date: Jun. 6, 2005

(87) PCT Pub. No.: WO2004/108625

PCT Pub. Date: Dec. 16, 2004

(65) Prior Publication Data

US 2006/0283356 A1 Dec. 21, 2006

(51) Int. Cl.
*C04B 11/00* (2006.01)

(52) U.S. Cl. .................. 106/772; 106/778; 156/39; 264/333

(58) Field of Classification Search ............ 106/772, 106/778; 156/39; 264/333
See application file for complete search history.

(56) References Cited

U.S. PATENT DOCUMENTS

| | | | |
|---|---|---|---|
| 2,699,414 A | 1/1955 | Selbe | |
| 3,869,414 A | 3/1975 | Campbell | |
| 3,891,453 A | 6/1975 | Williams | |
| 3,935,021 A | 1/1976 | Greve et al. | |
| 4,019,920 A | 4/1977 | Burkand et al. | |
| 4,042,409 A | 8/1977 | Terada et al. | |
| 4,094,694 A | 6/1978 | Long | |
| 4,174,230 A | 11/1979 | Hashimoto et al. | |
| 4,239,716 A | 12/1980 | Ishida et al. | |
| 4,328,178 A | 5/1982 | Kossatz | |
| 4,392,896 A | 7/1983 | Sakakibara | |
| 4,421,704 A | 12/1983 | Reily | |
| 4,645,548 A | 2/1987 | Take et al. | |
| 4,734,163 A | 3/1988 | Eberhardt et al. | |
| 4,748,196 A | 5/1988 | Kuroda et al. | |
| 5,009,269 A | 4/1991 | Moran et al. | |
| 5,120,355 A | 6/1992 | Imai | |
| 5,320,677 A | 6/1994 | Baig | |
| 5,482,551 A | 1/1996 | Morris et al. | |
| 5,695,553 A | 12/1997 | Claret et al. | |
| 5,922,447 A | 7/1999 | Baig | |
| 5,968,237 A | 10/1999 | Sinnige | |
| 5,980,628 A | 11/1999 | Hjelmeland et al. | |
| 6,010,596 A | 1/2000 | Song | |
| 6,066,201 A | 5/2000 | Wantling | |
| 6,162,839 A | 12/2000 | Klauck et al. | |
| 6,165,261 A | 12/2000 | Wamtling | |
| 6,172,122 B1 | 1/2001 | Lawate et al. | |
| 6,231,656 B1 | 5/2001 | Dekerf et al. | |
| 6,251,979 B1 | 6/2001 | Luongo | |
| 6,287,495 B1 | 9/2001 | Rosthauser | |
| 2006/0009535 A1* | 1/2006 | Wantling | .................. 516/43 |

FOREIGN PATENT DOCUMENTS

WO WO 03/004433 A1 1/2003

* cited by examiner

*Primary Examiner*—Paul Marcantoni

(57) ABSTRACT

A method is provided which uses an improved emulsion to imparting water-resistance to gypsum products. In one embodiment, gypsum products comprise calcium sulfate dihydrate and an emulsion which comprises a saponified wax, a nonsaponifiable wax, an alkyl phenol, a surfactant/dispersant salt of polynaphthalenesulfonic acid, and carboxymethylcellulose. Optionally, the emulsions may contain a preservative, e.g., a biocide (mildewcide, fungicide, etc.). These gypsum products resist the uptake of water and therefore resist biological infestation without addition of a preservative.

23 Claims, No Drawings

GYPSUM PRODUCTS AND METHOD FOR THEIR MANUFACTURE

The present invention relates to a wax emulsion additive useful in improving the water-resistance of gypsum products such as gypsum board and gypsum wood fiber products. The present invention further relates to a method of making the gypsum products using emulsion additives.

Certain properties of gypsum (calcium sulfate dihydrate) make it very popular for use in making industrial and building products, especially gypsum-containing panels. Gypsum is a plentiful and generally inexpensive raw material which, through a process of dehydration and rehydration, can be cast, molded or otherwise formed to useful shapes. The base material from which gypsum board is manufactured is the hemihydrate form of calcium sulfate (gypsum), commonly termed stucco, which is produced by the heat conversion of the dihydrate from which the water phase has been removed. The gypsum products in the panel board industry, include, but are not limited to, paper backed gypsum board, specialty gypsum board reinforced with glass mats and, as described further below, gypsum wood fiber products incorporating wood or lignin fibers, and other products.

A gypsum wood fiber (GWF) product differs from conventional gypsum wallboard products in that the GWF incorporates into the established slurry both gypsum and lignocellulosic material, e.g., wood fibers. The amount of wood fiber or other lignocellulosic material may be about 50 wt. % to about 95 wt. %, based on the combined weight of the gypsum and lignocellulosic material. A typical GWF product may comprise about 80% wood fiber by weight, based on the combined weight of gypsum and wood fiber. The lignocellulosic material is commonly referred to in the art as wood furnish. Sources of wood furnish include, but are not limited to, softwood such as pines, spruces and firs, and hardwood such as oaks, maples, eucalyptuses, poplars, beeches, and aspens. These products, like ordinary gypsum wallboard, gypsum tile, gypsum block, gypsum casts, and the like have relatively little resistance to water.

Gypsum products absorb water, which reduces their strength. Prior art products, like ordinary gypsum board, gypsum tile, gypsum block, gypsum casts, and the like have relatively little resistance to water. Actual tests have demonstrated that when a 2 inch by 4 inch cylinder of gypsum board core material was immersed in water at about 70° F., the cylinder showed a water absorption of 36% after immersion for 40 minutes. When ordinary gypsum board is immersed in water, the board quickly absorbs a considerable amount of water, and loses a great deal of its strength. In each of the gypsum products mentioned above, therefore, it is desirable to control the water uptake or absorption. Water also makes gypsum products susceptible to the growth of mold, mildew, fungi and other biological agents.

Historically, products added to a gypsum slurry to impart a degree of water-resistance in the board manufacturing process have incorporated asphalt, molten wax, emulsified wax/asphalt, emulsified wax, and various silicone products. These prior art systems have all demonstrated shortfalls in any number of performance related areas. These shortfalls include, but are not limited to, inconsistent solids, instability of the emulsions, wide ranges in apparent viscosity, a caustic pH requiring hazardous labeling, health risks due to the evolution of hydrogen and hydrogen sulfide gases. An additive is needed that can address the aforementioned issues and impart water-resistance to a gypsum product.

U.S. Pat. No. 6,663,707 to Wantling et al, dated Dec. 16, 2003 (published Jul. 17, 2003), teaches the incorporation of a generic starch species from corn, sago, wheat, rice, etc., with a complexing agent such as sodium borate in combination with other chemical compounds, specifically sodium lignosulfate, and C24 and greater polymerized alkyl phenol and various waxes forms a nearly stable wax emulsion suitable for incorporation into a gypsum slurry to impart water-resistance. While this system shows significant advantages over previously available wax emulsions it to suffers from a number of deficiencies, including: degradation of the pH due to bacteriological activity resulting from the decomposition of the sodium lignosulfate in long-term storage, viscosity changes as temperature and age occur manifesting itself as a slight separation at the water/wax interface, and less than predictable use rates at the mixer due to the changes occurring singularly and in combination.

U.S. Pat. No. 6,010,596 to Song teaches adding a wax emulsion containing a combination of a paraffinic hydrocarbon, montan wax, polyvinyl alcohol, water and emulsifiers to a hot slurry containing ground gypsum and wood fiber. Emulsifiers include nonionic and cationic surfactants. While still hot, the slurry is discharged through a headbox onto a continuous felting conveyor, such as the type used in paper making operations, to form a filter cake and remove as much uncombined water as possible.

Accordingly, there is a need for an additive which is useful in imparting water-resistance to gypsum products, and which is economical to apply. There is a need for a water-resistance additive which does not require the use of costly components such as polysiloxane. There is a further need for a water-resistance additive which is stable at room temperature and which does not require heating prior to application to a gypsum solution. There is still a further need for a stable water-resistance additive which does not require continuous mixing or agitation to maintain its stability. Accordingly, there is a need a method for making gypsum products that addresses one or more issues of water absorption, viscosity control, stability, and slurry fluidity when used to make gypsum products. Of course, such an additive should perform these functions without affecting fluidity, foamability, pre-set time or set time.

SUMMARY OF THE INVENTION

Disclosed herein is a method for making a gypsum product comprises forming a slurry comprising gypsum, water and an emulsion comprising a nonsaponifiable wax, a saponified wax, an alkyl phenol component, a dispersant/surfactant, a carboxymethylcellulose component, and water. In a particular embodiment, the nonsaponifiable wax may comprise about 33% to about 35% of the emulsion, by weight, the saponified wax may comprise about 3% to about 5% of the emulsion, by weight, the alkyl phenol component may comprise about 0.5% to about 2.5% of the emulsion, by weight, the dispersant may comprise about 0.5% to about 2% of the emulsion, by weight, and the carboxymethylcellulose component may comprise about 0.2% to about 5% of the emulsion, by weight. Optionally, the emulsions may comprise a preservative, e.g., a biocide (rmildewcide, fingicide, etc.). In various embodiments, the gypsum product may comprise gypsum board or a gypsum wood fiber product. Also described herein are gypsum products comprising gypsum, a wax component comprising a nonsaponifiable wax and a saponified wax, an alkyl phenol component, a dispersant/surfactant, and a carboxymethylcellulose component.

The above described and other features are exemplified by the following detailed description.

DETAILED DESCRIPTION

The manufacture of gypsum products, including gypsum board and composites made using gypsum, such as gypsum fiber composites, glass fiber-filled gypsum products, gypsum wood fiber products, etc. (collectively referred to as 'gypsum products'), may employ emulsions described herein to provide water resistance (hydrophobicity) to such products. When these emulsions are used, the maximum water absorption realized by such products is reduced as compared to products for which such emulsions are not used, i.e., the emulsions improve the water resistance characteristic of the products. By improving the water resistance of gypsum products, these emulsions ameliorate the detrimental effects that absorbed water can have on such products, including causing dimensional instability (swelling), loss of mechanical strength and biological degradation. The emulsions may also serve as carriers for optional additives such as fire retardants and preservatives which are not themselves water-repellant.

The manufacture of gypsum products generally comprises preparing a gypsum-containing slurry that contains gypsum and other components of the finished product, and then processing the slurry to remove the water and form and dry the remaining solids into the desired form. In the making of gypsum board, the gypsum is rendered into a slurry which must flow onto a paper substrate. The slurry/substrate combination is then sized in a continuous process by passing this combination between rollers. Simultaneous with this sizing step, a paper backing is positioned over the sized gypsum slurry. Accordingly, the gypsum slurry must possess sufficient fluidity so that a properly sized gypsum board can be made. Fluidity refers to the ability of the gypsum slurry to flow.

It is also important to the manufacture of gypsum board that the gypsum slurry be capable of being foamed to a limited extent. Foamability refers to this ability to be foamed. When the gypsum slurry and paper substrate are passed through the sizing rollers, a certain amount of the gypsum slurry must back flow and accumulate in the rollers nip so that a steady flow of gypsum is delivered to the sizing rollers. Foamability is important to this ability of the gypsum slurry to back flow at the rollers nip. Forming plates may be used, eliminating the use of a master roll, but foam is important to control density of the finished product.

The manufacture of gypsum board is a continuous manufacturing process wherein the gypsum slurry flows onto a substrate which then passes through sizing rollers. Therefore, the extent to which the gypsum slurry flows after it is sized is critical to maintaining the finished product dimensions of the gypsum board. The time interval from when the slurry is sized to when the gypsum slurry ceases its flow is referred to as the pre-set time. Therefore, pre-set time is an important property of the gypsum slurry. The set time of the gypsum slurry is also an important property. The set time refers to the amount of time it takes the gypsum slurry to be dried, under heat, to the finished, solid gypsum board. As is well known in the art, in a continuous gypsum board manufacturing process, it is important that the gypsum slurry possess a consistent set time.

Unlike the production of gypsum board, the production of a GWF product is facilitated through a conventional paper making process. The process of water felting dilute aqueous dispersions of various fibrous materials is a well-known commercial process for manufacturing many types of paper and board products. In this process, an aqueous dispersion of fiber, binder and other ingredients, as desired or necessary, is flowed onto a moving foraminous support wire, such as that of a Fourdrinier or Oliver mat forming machine, for dewatering. The dispersion may be first dewatered by gravity and then dewatered by vacuum suction means; the wet mat is then pressed to a specified thickness between rolls and the support wire to remove additional water. The pressed mat is then dried in heated convection or forced air drying ovens, and the dried material is cut to the desired dimensions. The manufacture of gypsum wood fiber products may be carried out similarly, utilizing a wet end section headbox distribution mechanism distributing the gypsum wood fiber slurry onto a vacuum wire for initial mat formation and dehydration followed by compression through a series of vacuum belt rolls and into a kiln for final dehydration. The addition of the emulsion does not cause wax plating or break-out on the vacuum belt. The gypsum wood fiber of the present invention does not incorporate paper face and back paper but rather is a paperless core that has similar performance and uses comparable to conventional sheathing products currently available.

An emulsion as described herein is used in the manufacture of a gypsum product (gypsum board, gypsum wood fiber products, etc.) by incorporating the emulsion into the gypsum-containing slurry that is used to make the gypsum product. Such an emulsion may comprise a wax component comprising a nonsaponifiable wax and a saponified wax (which may be formed during the preparation of the emulsion by the reaction of a saponifiable wax and a saponifier), an alkyl phenol component, a dispersant/surfactant, a carboxymethylcellulose component, and water. In contrast to the emulsion described in U.S. Pat. No. 6,663,707, these emulsions are optionally free of starch such as a complexed starch, and/or free of co-surfactants such as calcium lignosulfonate, sodium lignosulfonate and/or trisodium phosphate. The emulsion typically is added in an amount designed to provide about 1.5 weight % (wt. %) to about 3 wt. % wax in the finished product. The processing of the slurry is believed to break the emulsion, which releases the waxes therein and allows the waxes to migrate to the surface of the product, thus enhancing the water-resistance characteristics. Since water is a principal contributor to biological activity, the use of these emulsions reduces and may, in some cases, eliminate, biological activity in the gypsum product, without the need for a biocide. Optionally, however, the emulsions described herein can be adjuvants for impregnating preservatives into gypsum products in amounts effective to inhibit a biological activity, i.e., biological degradation, such as the growth of mildew, molds, fungi, etc.

Emulsions described herein comprise a wax component comprising a nonsaponifiable wax and a saponifiable wax. The nonsaponifiable wax may comprise a wax having a melting point greater than about 120° F. (about 49° C.), e.g., about 120° F. to about 165° F. (about 49° C. to about 74° C.), optionally about 120° F., to about 150° F. (about 49° C. to about 66° C.), and preferably about 135° F. to about 145° F. (about 57° C. to about 63° C.). (All ranges disclosed herein are inclusive and combinable, e.g., the ranges of "about 120° to about 165° F., optionally from 135° to 145° F.", are inclusive of the endpoints and all intermediate values of the ranges and combinations thereof, including, e.g., about 120° to about 145° F., about 130° to about 150° F., etc.) Suitable nonsaponifiable waxes include paraffin waxes, slack waxes and scale waxes. Such waxes are commercially known to be of low volatility, exhibiting less than about a 10% loss in weight during standard thermogravimetric analysis. Also, the oil content of these waxes is typically less than about 5% by weight, preferably less than about 1% by weight. Some of these waxes are of a relatively high molecular weight, having an average chain length of $C_{36}$, that is a 36 carbon chain length, or greater. Paraffin waxes are typically derived from light lubricating oil distillates and are predominantly straight chain hydrocarbons having an average chain length of 20 to 30 carbon atoms. Suitable paraffin waxes include Wax 3816 available from Honeywell/Astor of Duluth, Ga. Slack waxes are petroleum waxes having an oil content of 3 wt. % to 50 wt. %. Suitable slack waxes include Exxon 600 Slack Wax and Ashland 200 Slack Wax, and a combination of 50 parts Exxon 600 Slack Wax and 50 parts Ashland 200 Slack Wax.

A suitable saponifiable wax has an acid value or a saponification value and a melting point greater than about 180° F. (about 82° C.). Saponifiable waxes include waxes from the liquefication of coal, vegetable waxes and oxidized waxes resulting from the processing and/or refining of slack wax, scale wax or crude petroleum. For example, saponifiable waxes include montan wax, carnauba wax, beeswax, bayberry-myrtle wax, candelilla wax, caranday wax, castor bean wax, esparto grass wax, Japan wax, ouricury wax, retamoceri mimbi wax, shellac, spermaceti wax, sugar cane wax, wool-lanolin wax, and others. One example of a useful saponifiable wax is a montan wax having a melt point of about 190° to about 200° F. (about 88° to about 93° C.) melt point. Saponification of such waxes occurs as a result of combining the wax with a saponifier, i.e., strongly basic material such as ammonium hydroxide or an alkali metal hydroxide such as sodium hydroxide or potassium hydroxide. The amount of saponifier needed to saponify a wax may be calculated based on the saponification value of the wax. For example, the saponification value divided by 1000 equals the grams of potassium hydroxide to add per gram of wax.

Preferably, the waxes do not contain more than about 5% (by weight) polar compounds as impurities.

The wax component may be present in an amount of about 25 percent by weight (wt. %) to about 50 wt. %, based on the total weight of the emulsion, preferably about 30 wt. % to about 40 wt. %. Preferably, the wax component comprises a combination of a nonsaponifiable wax having a melting point of greater than or equal to about 120° F. and a saponifiable wax. The nonsaponifiable wax may comprise about 25 wt. % to about 44 wt. % of the total weight of the emulsion, and the saponifiable wax may comprise about 0.5 wt. % to about 5 wt. % of the total weight of the emulsion. A preferred combination of waxes is a combination of a paraffin wax such as Honeywell 3816 as the first wax and a saponifiable wax such as montan wax. In one embodiment, the wax component comprises paraffin wax in an amount of about 25 wt. % to about 45 wt. %, preferably about 30 wt. % to about 40 wt. %, and saponifiable wax in an amount of about 2.5 wt. % to about 5 wt. %, preferably about 3.5 wt. % to about 4.5 wt. %, based on the total weight of the emulsion.

A strongly basic compound is added to the emulsion mixture to saponify the saponifiable wax. The saponifier may comprise, e.g., ammonium hydroxide or an alkali metal hydroxide, e.g., sodium hydroxide or potassium hydroxide. The alkali metal hydroxide may be provided in the form of a concentrated aqueous solution that may comprise about 45% alkali metal hydroxide, by weight. Ammonium hydroxide may be provided in solid form. Some or all of the saponifier may also react with the dispersant, and/or with other component ingredients of the emulsion, in situ. Although ammonium hydroxide is sometimes objected to because of the ammonia odor it produces, ammonium hydroxide is believed to be advantageous because, in addition to saponifying the wax, the ammonia can serve as a scavenger for formaldehyde in the resin with which the emulsion is used, and may thus reduce the emission of formaldehyde from the finished composite product. The combination of ammonium hydroxide with formaldehyde also ameliorates the ammonium hydroxide odor, so in some embodiments, formaldehyde may be added to the emulsion for this purpose, for example, in an amount of about 0.02 to about 0.1% by weight. In addition, ammonium hydroxide is especially advantageous for when the emulsion is used with lignocellulosic materials comprising northern wood species, i.e., Douglas fir, aspen and the like.

The saponifier may be provided in an amount of about 0.15% to about 4.5%, optionally about 0.5% to about 3%, of the emulsion, by weight. Optionally, concentrated aqueous saponifier may be provided in an amount of about 0.5 to about 3% by weight of the emulsion; ammonium hydroxide may be added in solid form in an amount of about 0.15 to about 3% by weight of the emulsion. The amount of saponifier may be varied with the type of saponifiable wax used, or with the type of wood. As a result of the saponifier, an emulsion as described herein may have a pH of about 8.5 to about 12.5, for example, a pH of about 8.5 to about 9.5.

Exemplary carboxymethylcellulose materials useful in these emulsions have molecular carbon chain lengths of about 20 to about 50 carbons. An example of a suitable carboxymethylcellulose is carboxymethylcellulose sodium, available from Penn Carbose, Somerset, Pa., under the trade designation LT-30, which is described as having carbon chain lengths of about 26 to 30 carbons. Other suitable carboxymethylcellulose materials include Penn Carbose LT-20 and LT-42. The carboxymethylcellulose and the product of its reaction with the saponifier or with any other component in the emulsion are referred to herein as the "carboxymethylcellulose component".

A salt of polynaphthalenesulfonic acid is useful in the emulsions described herein and, without wishing to be bound by theory, is believed to act as a dispersant/surfactant. The salt may be the product of an in-situ reaction of polynaphthalenesulfonic acid and a saponifier, e.g., an alkali metal hydroxide. One commercially available polynaphthalenesulfonic acid is DISAL GPS which may be obtained from Handy Chemical, Montreal, Quebec, Canada. The acid and acid salt are referred to collectively as a polynaphthalenesulfonic acid component or, more broadly (to include substitute materials), as the dispersant/surfactant. The dispersant/surfactant may comprise about 0.1% to about 5% of the emulsion, by weight, optionally about 0.25 wt. % to about 5 wt. %.

Incorporating an alkyl phenol into the emulsions has been found to facilitate achieving low water absorption in the final lignocellulosic composite product. As used herein, "alkyl phenol" refers to a phenolic compound having a long chain alkyl group. The long chain alkyl group may be straight or branched. The long chain alkyl group may be $C_{20}$-$C_{42}$ (from 20 to 42 carbon chain length), e.g., $C_{24}$-$C_{34}$, preferably $C_{24}$-$C_{28}$. Such alkyl phenols include polymerized methylene-coupled alkyl phenol, phenate salts, calcium phenates, long branched chain calcium alkyl phenols, long straight chain calcium alkyl phenols and complex polymers of maleic acid with and without an amine group substitution. The long chain alkyl group may be a polymeric group such as a polyethylene, polypropylene, or polybutylene group, for example. The alkyl substituents may be a mixture of different chain lengths as is often the case with commercially available materials. Preferably, the alkyl phenol is chosen so that the average carbon chain length of the alkyl portion matches, i.e., is approximately the same as or is close to, the average carbon chain length of the carboxymethylcellulose. For example, an alkyl phenol of average chain length in the range of about $C_{24}$ to about $C_{34}$ may be used in an emulsion comprising carboxymethylcellulose having an average chain length of about 26 to about 32 carbons, e.g., Carbose LT-30 carboxymethylcellulose.

The alkyl group of the alkyl phenol can be derived from a corresponding olefin; for example, a $C_{26}$ alkyl group is derived from a $C_{26}$ alkene, preferably a 1-alkene, a $C_{34}$ alkyl group is derived from a $C_{34}$ alkene, and mixed length groups are derived from the corresponding mixture of olefins. When the alkyl group is an alkyl group having at least about 30 carbon atoms, however, it may be an aliphatic group (or a mixture of such groups) made from homo- or interpolymers (e.g., copolymers, terpolymers) of mono- and di-olefins having 2 to 10 carbon atoms, such as ethylene, propylene, butene-1, isobutene, butadiene, isoprene, 1-hexene, and 1-octene. Aliphatic hydrocarbyl groups can also be derived from halogenated (e.g., chlorinated or brominated) analogs of such homo- or interpolymers. Such groups can, however, be derived from other sources, such as monomeric high molecular weight alkenes (e.g., 1-tetracontene) and chlorinated analogs and hydrochlorinated analogs thereof, aliphatic petroleum fractions, particularly paraffin waxes and cracked and chlorinated analogs and hydrochlorinated analogs thereof, white oils, synthetic alkenes such as those produced by the Ziegler-Natta process (e.g., poly(ethylene) greases) and other sources known to those skilled in the art. Unsaturation in the hydrocarbyl groups can be reduced or eliminated, if desired, by hydrogenation according to procedures known in the art. Preparation by methods and materials that are substantially free from chlorine or other halogens is sometimes preferred for environmental reasons.

More than one alkyl group can be present, but usually no more than 2 or 3 are present for each aromatic nucleus in the aromatic group. Most typically only one hydrocarbyl group is present per aromatic moiety, particularly where the hydrocarbyl-substituted phenol is based on a single benzene ring.

The alkyl phenol and product of the reaction of an alkyl phenol with a saponifier or with any other component of the emulsion is referred to herein as the alkyl phenol component.

The amount of alkyl phenol component present in the emulsion is about 0.25 wt. % to about 10 wt. %, optionally about 0.5 wt. % to about 2.5 wt. % based on the total weight of the emulsion.

One example of an alkyl phenol component useful in the compositions of the present invention is commercially available under the trade designation 319H from Lubrizol Chem. Corp. Wycliffe, Ohio, which material is described as a $C_{24}$-$C_{34}$ polymerized methylene-coupled alkyl phenol. Various other, commercially available alkyl phenols that may be used in these emulsions, include the following (identified by arbitrary identifier numbers in the following Table 1:

TABLE 1

| Identification No. | Description | Source |
|---|---|---|
| 319A | Complex polymer of maleic acid (no amine group substitution) | "Flozol 140" Lubrizol Chem. Corp. Wycliffe, Ohio |
| 319B | Complex polymer of maleic acid (with amine group substitution) | "Flozol 145" Lubrizol Chem. Corp. Wycliffe, Ohio |
| 319C | Straight chain, long chain alkyl phenol | Lubrizol Chem. Corp. Wycliffe, Ohio |
| 319D | Calcium Phenate | Lubrizol Chem. Corp. Wycliffe, Ohio |

TABLE 1-continued

| Identification No. | Description | Source |
|---|---|---|
| 319E | Branched chain, long chain alkyl phenol | Lubrizol Chem. Corp. Wycliffe, Ohio |
| 319H | C 24-C 34 polymerized methylene-coupled alkyl phenol | Lubrizol Chem. Corp. Wycliffe, Ohio |

One method of manufacture for the emulsions described herein results in time, energy, operator, and production efficiencies. The method involves mixing the ingredients of the emulsion in a single vessel and then conveying the mixture of a homogenizer under conditions such as the following. An advantage of this method is that the emulsion mixture is prepared in a single vessel; it is not necessary to prepare and separately store partial mixtures of the ingredients of the emulsion in separate vessels before combining them together.

In one embodiment of a 'single vessel' method, the nonsaponifiable wax (e.g., 3816 wax, further described below) is melted and stored in molten form, e.g., at about 10° F. above its melt point temperature, and water is provided at a temperature that will not cause the wax to solidify. The vessel is then charged in the following illustrative manner:

a. Charge the melted nonsaponifiable wax, e.g., 3816 wax, at a temperature of about 189° F. to about 192° F. (about 87° C. to about 89° C.);

b. Start heat and agitation;

c. Charge molten saponifiable wax and alkyl phenol with continued agitation;

d. Charge a majority of the water, e.g., 95%, and continue agitation;

e. Charge the dispersant/surfactant, (e.g., DISAL polynaphthalenesulfonic acid, further described elsewhere herein), carboxymethylcellulose and saponifier;

f. Charge the remaining water—preferably including the water used to rinse the tubes calculated and subtracted out of the total;

g. Bring the tank up to temperature, e.g., about 190° F. to about 210° F. (about 88° C. to about 100° C.);

h. Continue to agitate while maintaining temperature for about 30 to about 150 minutes;

i. Put through homogenizer at about 1500 to about 3500 PSI (about 10 megaPascals (MPa) to about 24 MPa);

j. Cool, optionally in process that provides two exotherms, including a first exotherm between the exit temperature from the homogenizer to a temperature above ambient, and a second exotherm to ambient (storage) temperature. For example, the emulsion composition is passed from the homogenizer to a cooler to achieve a first exotherm of, e.g., about 10° F. to about 20° F. degrees lower than the homogenizer exit temperature, and then to a cooling tank to achieve a second exotherm of, e.g., about an additional 5° F. to about 15° F. lower, optionally under agitation. In one embodiment, the first exotherm may occur by cooling from about 130° F. to about 110° F., and the second exotherm may occur by cooling from about 110° F. to about 70° F.

Without wishing to be bound by any particular theory, using a two-exotherm cooling process allows a phasing process of the formation of the emulsion to proceed to completion. As a result, the viscosity of the emulsion is more stable over time and the emulsion is more stable when subject to shear agitation than if a single exotherm cooling process is used. In an alternative method of preparing the emulsion, a batch process may be used in which a first premix comprising the molten waxes and alkylphenol may be prepared, and a second premix (an aqueous premix) comprising the water, carboxymethylcellulose and polynaphthalenesulfonic acid and saponifier may be prepared, and the first and second premixes may then be combined in a mixing tank for a time sufficient at least for the waxes to become saponified, e.g., for one to three hours, and the resulting mix may then be passed to a homogenizer and cooled as described above.

Illustrative ranges of ingredients in some embodiments of emulsions described herein are provided in Table 2 below.

TABLE 2

ILLUSTRATIVE EMBODIMENTS

| Component | Typical Amount (% weight basis) |
|---|---|
| Nonsaponifiable Wax | 33-35 |
| Saponifiable Wax | 3-5 |
| Alkyl Phenol | 0.5-2.5 |
| Polynaphthalenesulfonic Acid | 0.5-2 |
| Carboxymethylcellulose | 0.2-5 |
| Saponifier | Amount used depends on amount of saponifiable wax; typically 0.5-3 |
| Water | Balance (to 100) |

The following Table 3 provides example proportions of ingredients in a specific embodiment of an emulsion as described herein.

TABLE 3

ILLUSTRATIVE EMULSION INCLUDING POLYNAPHTHALENESULFONIC ACID

| Component | Weight % |
|---|---|
| Wax 3816 | 33.00 |
| Saponifiable Wax | 3.00 |
| Alkyl Phenol | 0.50 |
| Polynaphthalenesulfonic Acid (DISAL GPS) | 0.50 |
| Carboxymethylcellulose | 0.2 |
| 45% KOH (saponifier) | 0.75 |
| Water | Balance (to 100) |

An emulsion as described herein may have a viscosity of about 10 to about 100 centipoise, measured on a Brookfield viscometer. One sample emulsion had a viscosity of 9 cps at about 40% solids. The stability and shear performance and lack of foam generation further enhance the ability to receive these emulsions. For example, one sample emulsion remained intact even after four minutes agitation in a food blender. Embodiments of these emulsions have been demonstrated not to contribute to biological activity.

A series of sample emulsions was made with the following common ingredients: 33% nonsaponifiable wax; 3% montan wax, 0.5% alkylphenol; 2% polynaphthalenesulfonic acid (or, where noted 2.5%); 0.5% carboxymethylcellulose. The various emulsions were made with the quantity of saponifier, the nonsaponifiable waxes and with additional components in the amount set forth in the following Table 4, with water comprising the balance. The samples of Table 4 were prepared using the batch process described above. In emulsions B and E, the indicated formaldehyde was included in the aqueous premix; in emulsions C, F, G, H, and I, the indicated formaldehyde was added to the emulsion after the emulsion was formed from the other components.

TABLE 4

| Emulsion | Ammonium hydroxide | formaldehyde | Nonsaponifiable wax |
|---|---|---|---|
| A | 0.38% | 0.0 | 3816 |
| B | 0.38% | 0.25 | 3816 |
| C | 0.38% | 0.25 | 3816 |
| D | 0.45% | 0.0 | 3816 |
| E | 0.45% | 0.25 | 3816 |
| F | 0.45% | 0.25 | 3816 |
| G[i] | 0.45% | 0.25 | 3816 |
| H | 0.45% | 0.25 | Prowax[ii] 561 |
| I | 0.45% | 0.25 | Prowax[ii] 321 |
| J | 0.45% | 0.0 | 3816 |

[i] Emulsion G contained 2.5% polynaphthalenesulfonic acid
[ii] Prowax 561 and 321 are hard paraffin waxes commercially available from ExxonMobil Corporation The utility of emulsions described herein in gypsum board was demonstrated as follows.

Test specimen slurries were made by mixing 50 grams of gypsum, 35.97 grams of water, and 1.92 grams of an emulsion set forth in Table 4. In a control slurry, no emulsion was added. Gypsum and water and, if added, emulsion, were mixed together and left to stand for one minute. This mixture was then mixed for an additional 30 seconds. After this second mixing, the specimen slurries were subjected to fluidity testing.

The specimen slurries were poured out onto a flat surface and the diameter of the resulting patty ("slump size") was measured. The diameter of a patty is an index of the fluidity of the specimen. The larger the diameter, the more fluid the specimen. The results are set forth in the following Table 5, in which the specimen slurries are identified according to the emulsion they contained.

The foamability test is used to determine the affect of a wax emulsion on the stability of foam in a gypsum slurry. In this test, 0.60 grams of a commercially available foamant and 2 grams of wax emulsion are weighed out. The foamant and the emulsion are placed into a blender along with 100 grams of water, and the mixture is blended for 20 seconds. At the end of this blending step, the foam is immediately poured from the blender cup into a tared 150 ml beaker to overflowing. Any excess is struck off the beaker. Any foam remaining in the blender cup is set aside. The foam density is determined by weighing the foam in the 150 ml beaker. Two minutes after the blending has stopped, any liquid in the remaining foam in the blender cup is drained and discarded. A clean, tared, 150 ml beaker is filled with the remaining foam to overflowing and the excess is struck off. A second foam density is determined as just described. The slurries containing emulsions of Table 4 yielded foam densities that were acceptable (i.e., compared favorably to the control) and ranged from about 40 to about 65 grams per 150 ml, for the measurements made at 20 seconds, and from about 10 to about 45 grams per 150 ml, for the measurements made at 2 minutes.

The patties made in the Fluidity Test were dried for at least 24 hours at 110° F. (43.3° C.). At the end of this time, the patties were weighed and the weight was recorded. The dried patties were then immersed in water for two hours. At the end of the two-hour immersion, the patties were weighed and this wet weight was recorded. Percent water retention was then calculated based on the difference between these two recorded weights. The results are set forth in the following Table 5, in which the specimen slurries are identified according to the emulsion they contained.

TABLE 5

| Slurry Identification | Slump Size | Dry Weight (grams) | Wet Weight (grams) | % Abs. |
|---|---|---|---|---|
| Blank | 10.3 cm (4 1/16") | 50.41 | 68.07 | 35 |
| A | 9.7 cm (3 13/16") | 49.86 | 50.06 | 0.41 |
| A | 9.7 cm (3 13/16") | 50.23 | 50.42 | 0.38 |
| B | 10 cm (3 15/16") | 50.6 | 50.76 | 0.32 |
| B | 10.16 cm (4") | 50.41 | 50.36 | −0.09 |
| C | 10.6 cm (4 3/16") | 42.49 | 52.44 | 0.3 |
| C | 10.8 cm (4 1/4") | 52.77 | 52.84 | 0.13 |
| G | 10.8 cm (4 1/4") | 53.81 | 53.71 | −0.18 |
| G | 10.95 cm (4 5/16") | 53.24 | 53.14 | −0.19 |
| H | 9.2 cm (3 5/8") | 46.84 | 47.99 | 2.46 |
| H | 9.2 cm (3 5/8") | 47.56 | 48.19 | 1.32 |
| D | 10.16 cm (4") | 50.91 | 51.26 | 0.69 |
| D | 10.16 cm (4") | 51.08 | 51.12 | 0.08 |
| E | 10.16 cm (4") | 50.93 | 51 | 0.14 |
| E | 10.16 cm (4") | 49.81 | 50.14 | 0.66 |
| F | 10.16 cm (4") | 51.89 | 52.18 | 0.56 |
| F | 10.3 cm (4 1/16") | 51.89 | 51.78 | −0.21 |
| G | 10.3 cm (4 1/16") | 54.94 | 5482 | −0.22 |
| G | 11.4 cm (4 1/2") | 54.72 | 54.61 | −0.2 |

As can be seen from the data of Table 5, the specimen slurries all exhibited fluidity comparable to the control; all were adequately fluid. In addition, the amount of water absorption for gypsum products made with wax emulsions was very significantly reduced from the 35% water absorption of the control gypsum product that made without the wax emulsions.

One embodiment of a method for making a gypsum wood fiber product comprises:
(a) mixing a slurry containing about 95 parts to about 50 parts of a wood fiber (by weight), about 5 parts to about 50 parts of gypsum, about 1 part to about 3 parts emulsion, balance water;
(b) distributing the slurry onto a vacuum wire for formation of a mat;
(c) partially drying the mat of step (b);
(d) compressing the mat of step (c) through a series of vacuum belt rolls; and
(e) drying the compressed mat of step (d) in an oven.

The amount of water in the slurry is an amount sufficient to facilitate depositing the slurry onto a vacuum wire for the formation of a mat. Various gypsum wood fiber articles may be made by this method including, but not limited to, wallboard and sheathing.

These wax-in-water emulsions may be added to a gypsum slurry without adversely affecting properties of the slurry which are necessary to the manufacture of gypsum products, i.e., fluidity, foamability, set time, etc. In optional embodiments, a dispersing aid, or fluidity modifier, is useful for the maintenance of the fluidity of the gypsum/emulsion mixture. Such dispersing agents are strong lipophiles, which are, consequently, good defoamers. One such dispersing agent is poly(oxy-1,2-ethanedyl), alphaphenyl-omega-hydroxy styrenate.

The use of the emulsions described herein provides significantly improved performance in both water uptake and edge and center swell in various gypsum products, allows relaxed storage requirements of the finished gypsum product, adds less wax and other emulsion components to the gypsum product than other emulsions at comparable water resistance rates for which the finished products must contain about 5 wt. % to about 6 wt. % wax. Not only does this lead to the use of less material, it also yields a gypsum product that emits fewer volatile emissions than gypsum products containing more wax. Further, these emulsions are amphoteric and will therefore be stable under a wide range of pH.

One or more preservatives, e.g., bactericides/fungicides, mildewcides, or other biocides, may optionally be included in a gypsum product by incorporating the preservative into the emulsion or into the gypsum-containing slurry. One example of a preservative suitable for gypsum products is a bactericide/fungicide known commercially as METASOL D3TA, which comprises 3,5-dimethyl-tetrahydro-1,3,5,2 H thiadiazine-2-thione. METASOL D3TA may be obtained from Ondo-Nalco, Houston, Tex. Mildewcide can include any commercially available mildewcide including formaldehyde. Other suitable biocides include bis-thio-benzene, propiconazole and bis(tributyltin)oxide. Optionally, one or more of these biocides or the others mentioned below may be incorporated into the gypsum-containing slurry in an amount calculated to be about 0.0025% to about 0.2% by weight of the product, optionally in the emulsion in an amount of about 0.1% to about 2% by weight of the emulsion.

To evaluate the ability of emulsions described herein to help retain absorbed preservatives (mildewcides, fungicides, etc.) for resistance to the growth of mold in gypsum products, a series of gypsum products were prepared and tested in accordance with the procedure described in ASTM D 3273. Separate gypsum panels were prepared using emulsions constituted to replicate emulsion G (Table 4), emulsions differing from emulsion G by the use of 0.1% formaldehyde rather than 2.5%, and emulsions differing from emulsion G by the absence of formaldehyde. In addition, gypsum panels were made with various samples of these emulsions that also included propiconazole, bis(tributyltin)oxide, or METASOL D3TA, in amounts of 0.2 wt %, 0.5 wt %, 0.75 wt % and 1 wt %. Briefly restated, the test described in ATSM D32-73 involves preparing a test chamber that includes a tank measuring about 46 centimenters (cm) by 46 cm by 61 cm into which water is added to a depth of about 50 to 75 millimeters. The chamber is held at a relative humidity of 95 to 98% at a temperature of 32.5° C. The chamber is further prepared for the test by placing a tray of greenhouse-grade potting soil in the chamber above the water, and inoculating the soil with cultures of *Aureobasidium pullulans, Aspergillus niger* and *Penicillium*. The mold is allowed to sporulate and equilibrate with the chamber for about two weeks. Test panels may then be hung in the chamber with the bottom about 75 millimeters above the inoculated soil. Mold growth on the surface of the panels is noted weekly for four weeks. Under such a test, if a panel supports mold growth, moderate mold growth is evident within 2 to 3 weeks. After the initial two weeks of the test period, none of the samples show signs of mold growth. This indicates that the water resistance imparted by the emulsions described herein leads to a significant inhibition of mold and other biological growth. It is expected that the samples containing biocide preservatives will resist biological growth for a longer period than those that do not contain biocide preservatives.

Suitable preservatives that may be incorporated into gypsum products with an emulsion described herein may be inorganic or organic, and include, for example biocides such as mildewcides and, fungicides and combinations thereof. The biocide may be chosen according to (1) the target organism; (2) solubility characteristics; (3) stability to the temperature and pH; and other conditions found in the manufacture of the gypsum product. Biocides include substances that kill or inhibit the growth of microorganisms such as molds, mildew, slimes, fungi, bacteria, etc. Fungicides include substances that kill or inhibit the growth of fungi. More specific examples of biocides include, but are not limited to, chlorinated hydrocarbons, organometallics, halogen-releasing compounds, metallic salts, organic sulfur compounds, and phenolics.

Suitable fungicides include, for example, zinc dimethyl dithiocarbamate, 2-methyl-4-t-butylamino-6-cyclopropylamino-s-triazine, 2,4,5,6-tetrachloroisophthalonitrile, N,N-dimethyl dichlorophenyl urea, copper thiocyanate, N-(fluorodichloromethylthio)phthalimide, N,N-dimethyl-N'-phenyl-N-'fluorodichloromethylthiosulfamide; copper, sodium and zinc salts of 2-pyridinethiol-1-oxide; tetramethylthiuram disulfide, 2,4,6-trichlorophenyl-maleimide, 2,3,5,6-tetrachloro-4-(methylsulfonyl)-pyridine, diiodomethyl p-tolyl sulfone, phenyl (bispyridil)bismuth dichloride, 2-(4-thiazolyl)-benzimidazole, pyridine triphenyl borane, phenylamides, halopropargyl compounds, propiconazole, cyproconazole, tebuconazole and 2-haloalkoxyaryl-3-isothiazolones (such as 2-(4-trifluoro-methoxyphenyl)-3-isothiazolone, 2-(4-trifluoromethoxy-phenyl)-5-chloro-3-isothiazolone, 2-(4-trifluoromethoxyphenyl)-4,5-dichloro-3-isothiazolone), and combinations comprising one or more of the foregoing fungicides.

The fungicide may be an agricultural fungicide such as, for example, dithiocarbamate and derivatives such as ferbam, ziram, maneb (manganese ethylenebisdithio-carbamate), mancozeb, zineb (zinc ethylenebisdithiocarbamate), propineb, metham, thiram, the complex of zineb and polyethylene thiuram disulfide, dazomet, and mixtures of these with copper salts; nitrophenol derivatives such as dinocap, binapacryl and 2-sec-butyl-4,6-dinitrophenyl isopropyl carbonate; heterocyclic structures such as captan folpet, glyodine, dithianon, thioquinox, benomyl, thiabendazole, vinolozolin, iprodione, procymidone, triadimenol, triadimefon, bitertanol, fluoroimide, triarimol, cycloheximide, ethirimol, dodemorph, dimethomorph, thifluzamide and quinomethionate; miscellaneous halogenated fungicides such as: chloranil, dichlone, chloroneb, tricamba, dichloran and polychloronitrobenzenes; fungicidal antibiotics such as: griseofulvin, kasugamycin and streptomycin; miscellaneous fungicides such as diphenyl sulfone, dodine, methoxyl, 1-thiocyano-2, 4-dinitrobenzene, 1-phenyl-thiosemicarbazide, thiophanate-methyl and cymoxanil; acylalanines such as furalaxyl, cyprofuram, ofurace, benalaxyl, and oxadixyl; fluazinam, flumetover, phenylbenzamide derivatives such as those disclosed in EP 578,586-A, amino acid derivatives such as valine derivatives disclosed in EP 550,788-A, methoxyacrylates such as methyl (E)-2-(2-(6-(2-cyanophenoxy)pyrimidin-4-yloxy)phenyl)-3-methoxyacrylate, benzo(1,2,3)thiadia-zole-7-carbothioic acid S-methyl ester, propamocarb, imazalil, carbendazim, myclobutanil, fenbu-conazole, tridemorph, pyrazophos, fenarimol, fenpiclonil, pyrimethanil, and combinations comprising one or more of the foregoing fungicides.

In addition to biocide preservatives, it may be desirable to treat gypsum products with fire retarding chemicals such as borax/boric acid, guanylurea phosphate-boric acid, dicyandiamide phosphoric acid formaldehyde, diethyl-N,N-bis(2-hydroxyethyl)-aminomethyl phosphate, and combinations comprising one or more of the foregoing additives. These fire retardants are readily incorporated into nanoparticles formed, for example, from polyvinylpyridine or polyvinylchloride. Other additives that are confer desirable characteristics and which may be added to the compositions include water repellants, colorants, UV inhibitors, adhesive catalysts, and combinations comprising one or more of the foregoing additives.

While certain embodiments and best mode of the present invention are described herein, these embodiments are merely illustrative. It will be apparent to those skilled in the art that modifications may be made therein without departing from the spirit of the invention and the scope of the appended claims.

What is claimed is:

1. A method for making a gypsum product, comprising: forming a slurry from gypsum, water and an emulsion comprising a wax component comprising a nonsaponifiable wax and a saponified wax, an alkyl phenol component, a dispersant/surfactant, a carboxymethylcellulose component, and water; and forming the slurry into a solid product.

2. The method of claim 1 wherein the wax component comprises about 25% to about 50% of the emulsion, by weight.

3. The method of claim 1 wherein the wax component comprises about 30% to about 40% of the emulsion, by weight.

4. The method of claim 1 wherein the nonsaponifiable wax is a slack wax, a scale wax, a paraffin wax or a combination thereof.

5. The method of claim 1 wherein the saponified wax is produced by reaction of a saponifiable wax with ammonium hydroxide, an alkali metal hydroxide or a combination thereof.

6. The method of claim 5 comprising a saponified wax produced by reaction of a saponifiable wax with potassium hydroxide or sodium hydroxide.

7. The method of claim 5 comprising a saponified wax produced by reaction of a saponifiable wax with ammonium hydroxide.

8. The method of claim 1 wherein the alkyl phenol component comprises a $C_{20}$-$C_{42}$ alkyl group.

9. The method of claim 1 wherein the alkyl phenol component comprises a $C_{24}$-$C_{34}$ alkyl group.

10. The method of claim 1 wherein the alkyl phenol component comprises a $C_{24}$-$C_{28}$ alkyl group.

11. The method of claim 1 wherein the dispersant/surfactant comprises a polynaphthalenesulfonic salt.

12. The method of claim 1 wherein the alkyl phenol component comprises an alkyl phenol having an alkyl group that has an average carbon chain length that matches the carbon chain length of the carboxymethylcellulose.

13. The method of claim 1, wherein the nonsaponifiable wax comprises about 33% to about 35% of the emulsion, by weight; the saponified wax comprises about 3% to about 5% of the emulsion, by weight; the alkyl phenol component comprises about 0.5% to about 2.5% of the emulsion, by weight; the dispersant/surfactant comprises about 0.5% to about 2% of the emulsion, by weight; and the carboxymethylcellulose component comprises about 0.2% to about 5% of the emulsion, by weight.

14. The method of claim 13 wherein the saponified wax is produced by a reaction of a saponifiable wax with ammonium hydroxide, and further comprising about 0.5% formaldehyde, by weight.

15. The method of claim 1 wherein the gypsum product comprises gypsum board.

16. The method of claim 1 wherein the slurry further comprises about 50 wt. % to about 95 wt. % of a lignocellulosic material based on the combined weight of the lignocellulosic material and gypsum.

17. The method of claim 13 wherein the gypsum product comprises gypsum board.

18. The method of claim 13 wherein the slurry further comprising about 50 wt. % to about 95 wt. % of a lignocellulosic material, by the combined weight of the lignocellulosic material and the gypsum.

19. The method of claim 13 wherein the gypsum product comprises a gypsum wood fiber product.

20. The method of claim 1 wherein the emulsion contains wax in an amount of about 1.5 wt. % to about 3 wt. % by weight of the finished product.

21. The method of claim 13 wherein the emulsion contains wax in an amount of about 1 wt. % to about 3 wt. % by weight of the finished product.

22. The method of claim 1 wherein the slurry comprises a preservative in an amount of about 0.0025 wt. % to about 0.2 wt. % by weight of the product.

23. The method of claim 13 wherein the emulsion comprises about 0.1% to about 2% preservative, by weight.

* * * * *